United States Patent Office 3,438,731
Patented Apr. 15, 1969

3,438,731
METHOD OF PRODUCING FLAKE GRAPHITE
Gilbert S. Layne and James O. Huml, Midland, Mich., assignors to The Dow Chemical Company, Midland, Mich., a corporation of Delaware
Filed Feb. 13, 1967, Ser. No. 615,618
Int. Cl. C01b *31/04*
U.S. Cl. 23—209.1                            6 Claims

ABSTRACT OF THE DISCLOSURE

A process for producing flake graphite which comprises heating, in an inert atmosphere, a mixture of a metal carbide and a metal sulfide or halide capable of forming a gaseous subvalent metal compound. When the temperature of the mixture reaches the formation temperature of the gaseous subvalent metal compound, such compound is removed as a gas from a solid residue of graphite flakes. The metal carbide starting material may be prepared either by direct reaction of a carbide-forming metal with carbon or by cooling a subvalent metal compound to below its formation temperature in the presence of carbon.

BACKGROUND OF THE INVENTION

Graphite is now commonly prepared by pyrolysis of carbon, such as coal, coke, lamp black and the like, at temperatures of greater than 2000° C. Such a process requires long pyrolysis times and usually produces a massive form of graphite. Another method of preparation of graphite involves the high temperature pyrolysis of hydrocarbons such as methane. Again, however, the process is time consuming and does not produce graphite in a flake form.

SUMMARY OF THE INVENTION

This invention relates to a novel process for producing graphite and more particularly relates to a process for producing graphite in the form of relatively dust-free flakes.

It is an object of this invention to provide a novel process for producing flake graphite from a carbon source material. A further object is to provide a process for the relatively rapid conversion of carbon, massive graphite, aluminum carbide or the like into a substantially dust-free form of graphite flakes. These and other objects and advantages of the present process will become apparent from a reading of the following detailed description.

It has now been discovered that substantially dust-free flakes of graphite are prepared by contacting a subvalent metal compound with a carbon source for a time sufficient to permit reaction of the subvalent metal compound with the carbon source. Cooling of the zone of contact to below the temperature of formation of the subvalent compound will produce a metal carbide and the normal valent metal compound of the metal. Raising the temperature again promotes the reaction of metal carbide and the normal valent metal compound to produce graphite and the gaseous subvalent metal compound. For example, a mixture of aluminum metal, aluminum sulfide ($Al_2S_3$) and powdered carbon heated to a temperature of about 1700° C. and cooled again to room temperature will produce glossy black flakes of graphite that are substantially dust-free. The heating in this illustration first causes reaction between Al and C to form $Al_4C_3$. Continued heating promotes reaction between $Al_4C_3$ and $Al_2S_3$ to produce gaseous $Al_2S$ and flake graphite. Cooling of the gaseous $Al_2S$ to below its temperature of formation will cause disproportionation of the $Al_2S$ to Al and $Al_2S_3$.

While the reaction mechanism is not completely established, it is thought, for example, to involve the following reactions for a system where the reactants are aluminum, aluminum fluoride and carbon:

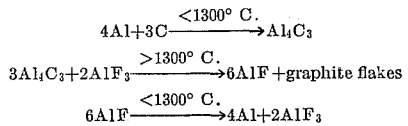

Alternatively, where there is no direct contact between a defined carbide-forming metal and the carbon source, the following reactions are thought to illustrate the mechanism for a system employing aluminum, aluminum fluoride and carbon:

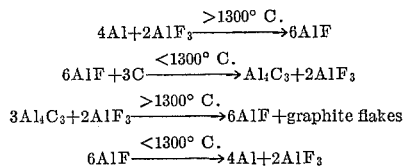

DESCRIPTION OF PREFERRED EMBODIMENTS

Any gaseous subvalent metal compound may be employed in the practice of this invention if the metal thereof forms a defined carbide. Such subvalent metal compounds are usually prepared by mixing a metal and a sulfide or halide of such metal then heating the mixture to a temperature sufficient to produce the gaseous subvalent metal compound. Such compounds are stable only in the gaseous state and at elevated temperatures. Upon cooling below their formation temperature in the presence of carbon, the molecules of subvalent metal compounds combine with carbon to form their corresponding carbides and normal valent metal sulfide or halide mixture. Many subvalent metal compounds are known in the art and are useful herein. These include $Al_2S$, $AlX$, $SiX_2$, $SiX_3$, $TiX_2$ and $TiX$ wherein X is a halogen. The subvalent metal sulfides and halides of aluminum such as $Al_2S$, $AlCl$ and $AlF$, have been found to be particularly useful in the practice of this invention.

By the expression "carbon source material" as used herein, is meant any form of carbon or graphite or reaction products thereof where the carbon values are available for reaction with the subvalent metal compound. This includes carbon such as coal, coke, carbon black and the like in either massive or powder form, hydrocarbons, natural or synthetic graphite and carbides of metals which form gaseous subvalent compounds such as aluminum carbide.

Due to the temperatures employed and nature of the reactions involved in this invention, it is necessary that the process be conducted in a non-oxidizing atmosphere. Atmospheres of hydrocarbon gases, $H_2$ or inert gases such as argon may be used.

A carbon source material may be converted to graphite flakes according to the process of this invention by admixing such carbon source material with metal-metal compound precursors of the subvalent metal compound, heating the mixture to a temperature sufficient to produce such subvalent metal compound and allowing the mixture to cool. In this method, the graphite flakes will normally be found in the bottom section of the reaction vessel and the mixed metal-metal compound will be found in the upper portion of the vessel.

Figure 1:
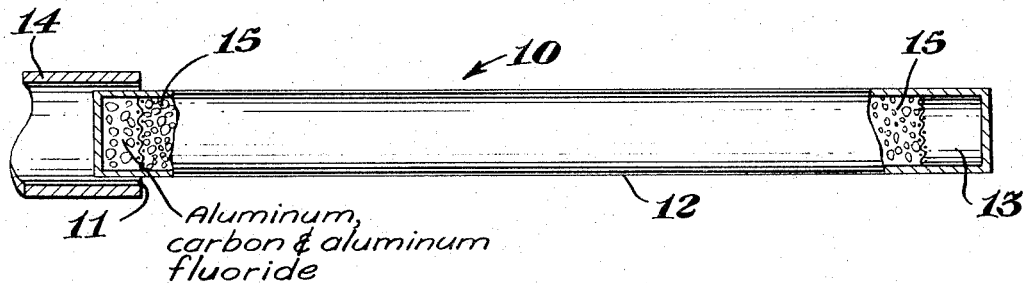
FIGURES 1–3 are diagrammatic illustrations in sectional elevation showing apparatus which may be used in practicing the process of the present invention and further illustrating one method of conducting the process of this invention.
Figure 2:
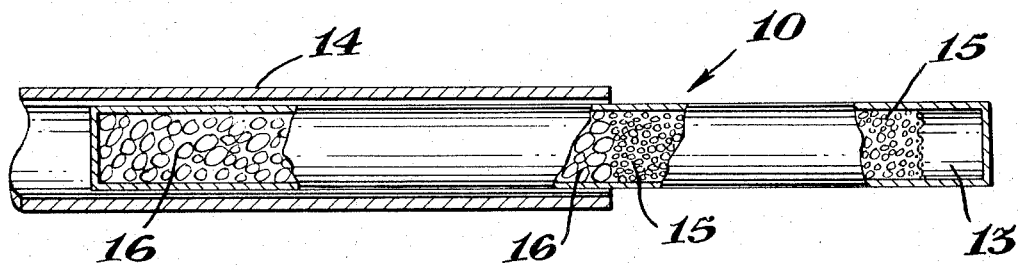
Figure 3:
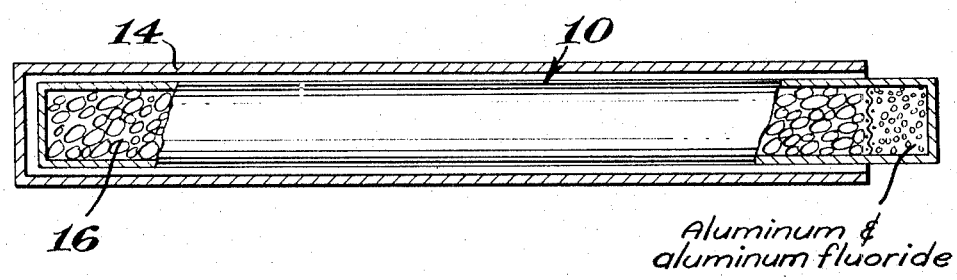

The figures herein illustrate a preferred embodiment of the invention wherein in FIGURE 1 high temperature reactor 10 contains three portions or zones. The first zone 11 contains a mixture of metallic aluminum, carbon and aluminum fluoride capable of high temperature reaction to form AlF, a subvalent halide of aluminum and aluminum carbide. The second zone 12 contains only particulate carbon and the third zone 13 is initially empty. The first zone 11 of reactor 10 is placed inside of heated furnace 14 to heat the mixture of aluminum metal, carbon and aluminum fluoride. Aluminum carbide is formed by the reaction of carbon and aluminum and, at a temperature of at least about 1300° C. $AlF_3$ reacts with $Al_4C_3$ to produce graphite flakes 16 and AlF (the subvalent fluoride of aluminum) which passes as a gas into the carbon-containing zone 12 of the reactor 10. Upon reaching the cooler carbon-containing zone, the AlF reacts with the carbon 15 to produce $Al_4C_3$ and $AlF_3$. As the reactor 10 is moved further into the furnace 14, gaseous AlF moves along the reactor in and in front of the heated zone and converts carbon 15 into graphite flakes 16. When only the initially empty zone 13 remains outside of the furnace 14 all of the carbon 15 has been converted to graphite 16 and the relatively cool zone 13, being below the formation temperature of AlF, contains the aluminum metal and $AlF_3$.

By removing the graphite flakes and refilling zone 12 of the reactor with carbon source material, and zone 13 with a mixture of aluminum, carbon and aluminum fluoride, the process may be repeated by first inserting zone 13 into the furnace. Heating this mixture to produce AlF and again moving the reactor 10 further into the furnace 14 will convert additional carbon 15 into graphite flakes 16.

The following examples are provided to further illustrate the invention but are not to be construed as limiting to the scope of such invention.

Example 1

A graphite crucible was enclosed in a high-temperature gas-tight silica shell. 150 grams of $Al_2S_3$ and 108 grams of Al were placed in the bottom of the crucible and argon atmosphere was admitted and maintained during the experiment. Heat was supplied by an induction field until a temperature of ~1650° C. was obtained within the crucible. These conditions were held for 3 hours. The reactor was cooled, dismantled and examined. A large deposit of glossy black flakes were found to have filled the crucible to about one-half its height. It was further found that the Al and $Al_2S_3$ deposits were adhered to the walls of the crucible above the mass of black flakes and above the heated zone. X-ray diffraction analyses of these flakes showed them to be graphite.

Example 2

A graphite tube is partially filled with carbon. At one end of the tube is placed a mixture of Al metal, carbon and a molar excess of $AlF_3$. A heated zone (about 1700° C.) is advanced starting from the end containing the $$Al—AlF_3—C$$

mixture and slowly passed along the length of the tube. The Al is moved as the gaseous subvalent compound (AlF) by the action of heat, leaving a deposition of black glossy graphite flakes in its path. Any unreacted $AlF_3$ is also carried along by the heated zone as it sublimes at about 1100° C.

Various modifications can be made in the present invention without departing from the spirit or scope thereof for it is understood that we limit ourselves only as defined in the appended claims.

We claim:
1. A process for the production of flake graphite which comprises admixing, in an inert atmosphere, a defined metal carbide with a metal sulfide or metal halide capable of forming of gaseous subvalent metal compound, heating said mixture to a temperature sufficient to produce a gaseous subvalent metal compound and separating the gaseous subvalent metal compound thus formed from a solid residue of graphite flakes.
2. The process of claim 1 wherein the metal carbide is aluminum carbide.
3. The process of claim 2 wherein the metal sulfide or metal halide is $Al_2S_3$.
4. The process of claim 2 wherein the metal sulfide or metal halide is $AlF_3$.
5. A process for the production of flake graphite which comprises:
 (a) contacting, in an inert atmosphere, a gaseous subvalent metal compound with a carbon source and cooling said gaseous subvalent metal compound in contact with said carbon source to a temperature below the temperature of formation of said subvalent metal compound to form a metal carbide and a normal valent metal compound,
 (b) heating the mixture thus formed to a temperature at least equal to the formation temperature of the gaseous subvalent metal compound, and
 (c) removing the gaseous subvalent metal compound from a solid residue of graphite flakes.
6. The process of claim 5 wherein the subvalent metal compound is AlF or $Al_2S$.

References Cited
UNITED STATES PATENTS

| 711,031 | 10/1902 | Acheson | 23—209.1 |
| 1,191,383 | 7/1916 | Aylsworth | 23—209.1 X |
| 2,653,082 | 9/1953 | Gardner | 23—209.1 |

EDWARD J. MEROS, *Primary Examiner.*

U.S. Cl. X.R.

23—87, 88, 93, 134, 208